(12) United States Patent
He et al.

(10) Patent No.: US 10,467,349 B2
(45) Date of Patent: Nov. 5, 2019

(54) METHOD AND APPARATUS FOR TRANSLATING BASED ON ARTIFICIAL INTELLIGENCE

(71) Applicant: BEIJING BAIDU NETCOM SCIENCE AND TECHNOLOGY CO., LTD., Beijing (CN)

(72) Inventors: Zhongjun He, Beijing (CN); Hongyu Liu, Beijing (CN); Shiqi Zhao, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 104 days.

(21) Appl. No.: 15/832,013

(22) Filed: Dec. 5, 2017

(65) Prior Publication Data
US 2018/0165278 A1 Jun. 14, 2018

(30) Foreign Application Priority Data
Dec. 12, 2016 (CN) .......................... 2016 1 1138600

(51) Int. Cl.
*G06F 17/00* (2019.01)
*G06F 3/00* (2006.01)
(Continued)

(52) U.S. Cl.
CPC ........ *G06F 17/289* (2013.01); *G06F 17/2818* (2013.01); *G06F 17/2845* (2013.01);
(Continued)

(58) Field of Classification Search
CPC .................................. G06F 17/28; G10L 11/00
See application file for complete search history.

(56) References Cited

U.S. PATENT DOCUMENTS 7,107,204 B1 * 9/2006 Liu ........................ G06F 17/273
704/2
8,914,277 B1 * 12/2014 Liu ........................ G06F 17/271
704/10

(Continued)

FOREIGN PATENT DOCUMENTS

CN 101206643 6/2008

OTHER PUBLICATIONS

SIPO, First Office Action for CN Application No. 201611138600, dated Feb. 2, 2019.

*Primary Examiner* — Shreyans A Patel
(74) *Attorney, Agent, or Firm* — Hodgson Russ LLP (57) ABSTRACT

The resent disclosure provides a method and an apparatus for translating based on artificial intelligence. With the method, the text to be translated from the source language to the target language is acquired, in which, the text includes the target language term and the source language term. The candidate terms for translating the source language term and confidences of the candidate terms are determined. The candidate terms are used to replace the corresponding source language term, and each candidate term is combined with the target language term, so as to obtain each candidate translation. A probability of forming a smooth text when the candidate term is used in the candidate translation is predicted. Then the target term is chosen to be recommended according to the language probabilities of the candidate translations and the confidences of the candidate terms.

20 Claims, 5 Drawing Sheets

(51) Int. Cl.
*G06F 17/28* (2006.01)
*G06N 3/02* (2006.01)
*G06N 3/04* (2006.01)
*G06N 3/08* (2006.01)

(52) U.S. Cl.
CPC .......... *G06F 17/2872* (2013.01); *G06N 3/02* (2013.01); *G06N 3/0445* (2013.01); *G06N 3/0472* (2013.01); *G06N 3/08* (2013.01)

(56) References Cited

U.S. PATENT DOCUMENTS

| | | | |
|---|---|---|---|
| 10,185,713 B1* | 1/2019 | Denkowski | G06F 17/2818 |
| 2004/0098247 A1* | 5/2004 | Moore | G06F 17/2818 704/4 |
| 2006/0095248 A1* | 5/2006 | Menezes | G06F 17/28 704/3 |
| 2006/0136223 A1* | 6/2006 | Brun | G06F 17/289 704/277 |
| 2008/0126074 A1* | 5/2008 | Whitelock | G06F 17/2827 704/2 |
| 2009/0157386 A1* | 6/2009 | Zhou | G06F 17/28 704/9 |
| 2011/0131032 A1* | 6/2011 | Yang, II | G06F 17/2818 704/2 |
| 2013/0144592 A1* | 6/2013 | Och | G06F 17/273 704/2 |
| 2014/0172407 A1* | 6/2014 | Eden | G06F 17/2809 704/2 |
| 2014/0200878 A1* | 7/2014 | Mylonakis | G06F 17/2818 704/4 |

\* cited by examiner

This paper proposes a method to improve translation model

Fig. 3

| This paper | 提出 | a new method |

- proposes
- introduces
- presents

Fig. 4

| This paper | 提出 | a | 新方法 |

- proposes
- presents
- introduces

- novel method
- new method
- new way

METHOD AND APPARATUS FOR TRANSLATING BASED ON ARTIFICIAL INTELLIGENCE

CROSS-REFERENCE TO RELATED APPLICATION

This application is based on and claims a priority to Chinese Patent Application Serial No. 201611138600.X, filed on Dec. 12, 2016, the entire content of which is incorporated herein by reference.

FIELD

The present disclosure relates to the field of natural language processing, and more particularly, to a method and an apparatus for translating based on artificial intelligence.

BACKGROUND

Artificial Intelligence (short for AI) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc.

In the related art, a whole sentence is translated from a source language to a target language by translation software. However, an accurate translation result cannot be provided by the translation software. Thus the translation result provided by the translation software is needed to be modified by the user. Particularly, when a syntactical structure used by the translation software is not what the user expected, more modifications need to be done. While, the way of translating the whole sentence may lose some contents that the user wants to express in the target language, and translation accuracy is unsatisfied. Therefore, the translation method in the related art is not quite flexible thus cannot meet requirements of the user, and the translation accuracy is unsatisfied.

SUMMARY

Embodiments of the present disclosure provide a method for translation based on AI, which includes: acquiring a text to be translated from a source language to a target language, in which the text to be translated includes a target language term and a source language term; inputting the text to be translated into a translation model of the source language and the target language trained in advance, and determining candidate terms for translating the source language term and confidences of the candidate terms; replacing the source language term by each of the candidate terms, and combining the each of the candidate terms with the target language term, so as to obtain candidate translations; inputting each of the candidate translations into a language model of the target language trained in advance, and predicting a language probability of the each of the candidate translations to form a smooth text by using the corresponding candidate term; choosing a target term from the candidate terms according to the language probabilities of the candidate translations and the confidences of the candidate terms; and recommending the target term.

Embodiments of the present disclosure provide an apparatus for translating based on AI, which includes: a processor; a memory for storing instructions executable by the processor; in which, the processor is configured to: acquire a text to be translated from a source language to a target language, in which, the text to be translated includes a target language term and a source language term; input the text to be translated into a translation model of the source language and the target language trained in advance, and determine candidate terms for translating the source language term and confidences of the candidate terms; replace the source language term by each of the candidate terms, and combine the each of the candidate terms with the target language term, so as to obtain candidate translations; input each of the candidate translations into a language model of the target language trained in advance, and predict a language probability of the each of the candidate translations to form a smooth text by using the corresponding candidate term; choose a target term from the candidate terms according to the language probabilities of the candidate translations and the confidences of the candidate terms and recommend the target term.

Embodiments of the present disclosure provide a non-transitory computer readable storage medium. When instructions stored in the storage medium are executed by a processor of a server, the server is caused to perform a method for translating based on AI, and the method includes: acquiring a text to be translated from a source language to a target language, in which the text to be translated includes a target language term and a source language term; inputting the text to be translated into a translation model of the source language and the target language trained in advance, and determining candidate terms for translating the source language term and confidences of the candidate terms; replacing the source language term by each of the candidate terms, and combining the each of the candidate terms with the target language term, so as to obtain candidate translations; inputting each of the candidate translations into a language model of the target language trained in advance, and predicting a language probability of the each of the candidate translations to form a smooth text by using the corresponding candidate term; choosing a target term from the candidate terms according to the language probabilities of the candidate translations and the confidences of the candidate terms; and recommending the target term.

Embodiments of the present disclosure provide a computer program product. When instructions stored in the computer program product are executed by a processor, a method for translation based on AI is performed, and the method includes: acquiring a text to be translated from a source language to a target language, in which the text to be translated includes a target language term and a source language term; inputting the text to be translated into a translation model of the source language and the target language trained in advance, and determining candidate terms for translating the source language term and confidences of the candidate terms; replacing the source language term by each of the candidate terms, and combining the each of the candidate terms with the target language term, so as to obtain candidate translations; inputting each of the candidate translations into a language model of the target language trained in advance, and predicting a language probability of the each of the candidate translations to form a smooth text by using the corresponding candidate term; choosing a target term from the candidate terms according to the language probabilities of the candidate translations and the confidences of the candidate terms; and recommending the target term.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of the present disclosure will become apparent and more easily to understand from the following descriptions of the embodiments of the present disclosure with reference to the drawings, in which.

DETAILED DESCRIPTION

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The method and the apparatus for translating based on artificial intelligence (AI) according to embodiments of the present disclosure will be described with reference to drawings as follows.

Figure 1:
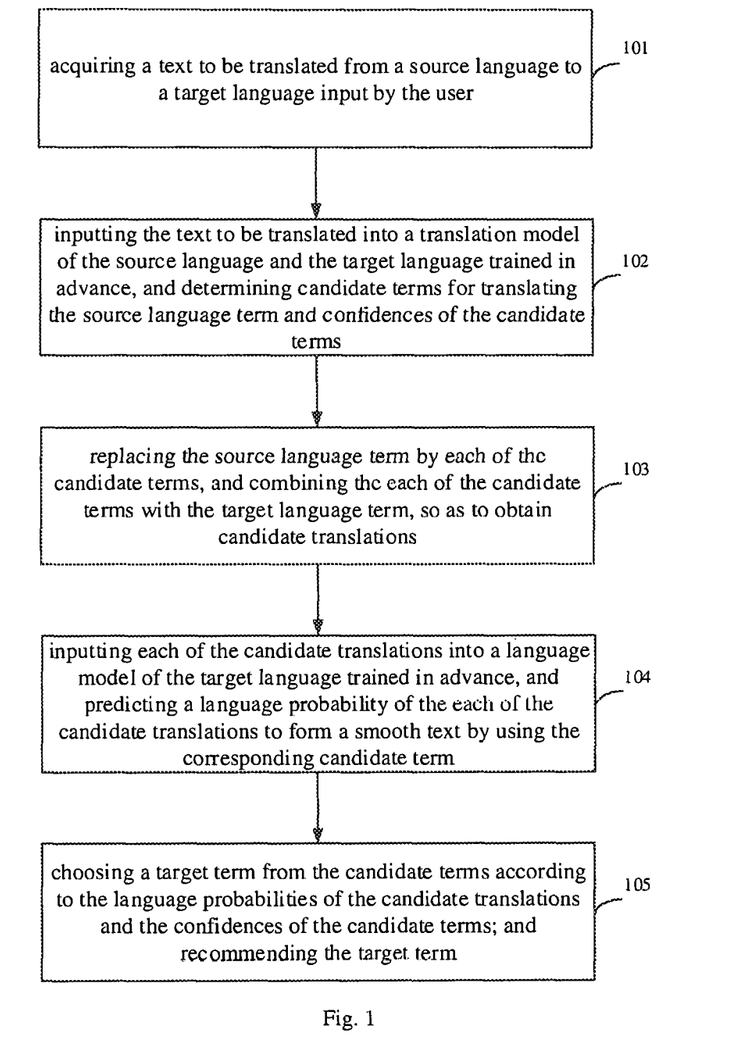
FIG. 1 is a flow chart illustrating a method for translating based on AI according to an embodiment of the present disclosure.

FIG. 1 is a flow chart illustrating a method for translating based on AI according to embodiments of the present disclosure.

As illustrated in FIG. 1, the method for translating based on AI includes followings.

At block 101, a text to be translated from a source language to a target language input by the user is acquired.

In detail, the text to be translated includes a target language term and a source language term.

During a process of translating the source language to the target language, under a condition that the user is not sure about the translation, the text to be translated including at least one segment of source language term and at least one segment of target language term may be input, in which the source language term is a term that the user is not sure about how to translate and a corresponding target term need to be recommended; the target language term is a term that has already been confirmed by the user and does not need recommendation.

At block 102, the text to be translated is input into a translation model of the source language and the target language trained in advance, and candidate terms for translating the source language term and confidences of the candidate terms are determined.

In detail, the translation model is trained in advance by a bilingual corpus of the source language and the target language, so as to obtain source language terms and target language terms which have semantic correspondences, and confidences of translating accurately the source language terms by the corresponding target language terms. Therefore, when the text to be translated is input into the trained translation model of the source language and the target language, the candidate terms for translating the source language term and the confidence of each of the candidate terms can be determined.

In detail, the confidence of the candidate term may be denoted according to a ratio that the number of times that the source language term is translated into the corresponding target language term accounts for the number of times that the source language term is translated.

At block 103, each of the candidate terms is used to replace the source language term in the text to be translated, and combined with the target language term, so as to obtain each candidate translation.

Generally, there might be more than one candidate terms for each source language term to be translated. For the each of the candidate terms, the source language term is replaced by the each of the candidate terms. Therefore the candidate term is combined with the target language term so as to form a candidate translation. This candidate translation includes the target language only.

At block 104, each of the candidate translations is input into a language model of the target language trained in advance, and a language probability of the each of the candidate translations to form a smooth text by using the corresponding candidate term is predicted.

In detail, the language model of the target language is trained according to a target language corpus in advance, in which the target language corpus is established according to at least one of academic conferences, academic journals, and papers of the target language. Thus, the corpus of the target language is learned by the language model. When the each of the candidate translations is input into the language model of the target language trained in advance, the language probability of the each of the candidate translations to form the smooth text by using the corresponding candidate term is predicted.

In an embodiment, the language model is an n-gram model. The n-gram model is a language model that often used in big term continuous speech recognition. In an embodiment, the language model can also be a recurrent neural network language model (RNN-LM).

At block 105, a target term is chosen from the candidate terms according to the language probabilities of the candidate translations and the confidences of the candidate terms and the target term is recommended.

In detail, for the each of the candidate terms, a weighted summation of the language probability of the corresponding candidate translation by using the each of the candidate terms and the confidence of the each of the candidate terms is calculated so as to obtain an overall probability of the each of the candidate terms. The candidate terms are sorted according to their overall probabilities and the target term is chosen from the candidate terms according to a sorting result.

Generally, the target term include at least two target terms. The at least two target terms may be displayed under the corresponding source language term, in an order of the overall probabilities from great to small. In addition, the overall probability of each of the at least one two target terms may be tagged aside by a progress bar.

With the present embodiment, the text to be translated from the source language to the target language input by a user is acquired, in which, the text to be translated includes the target language term and the source language term. The text to be translated is input into the translation model of the source language and the target language trained in advance, and the candidate terms for translating the source language term and the confidences of the candidate terms are determined. The candidate terms are used to replace the source language term in the text to be translated, and each candidate term is combined with the target language term, so as to obtain each candidate translation. The candidate translation is input into the language model of the target language trained in advance, and the probability of forming the smooth text when the candidate term is used in the candidate translation is predicted. Then the target term is chosen to recommend from the candidate terms according to the language probabilities of the candidate translations and the confidences of the candidate terms. Since when the user is not sure about the translation, the target term surely to be accurate and the source language term of which translations are not sure may be input, the problem of inflexible translation in the prior art may be solved.

Figure 2:
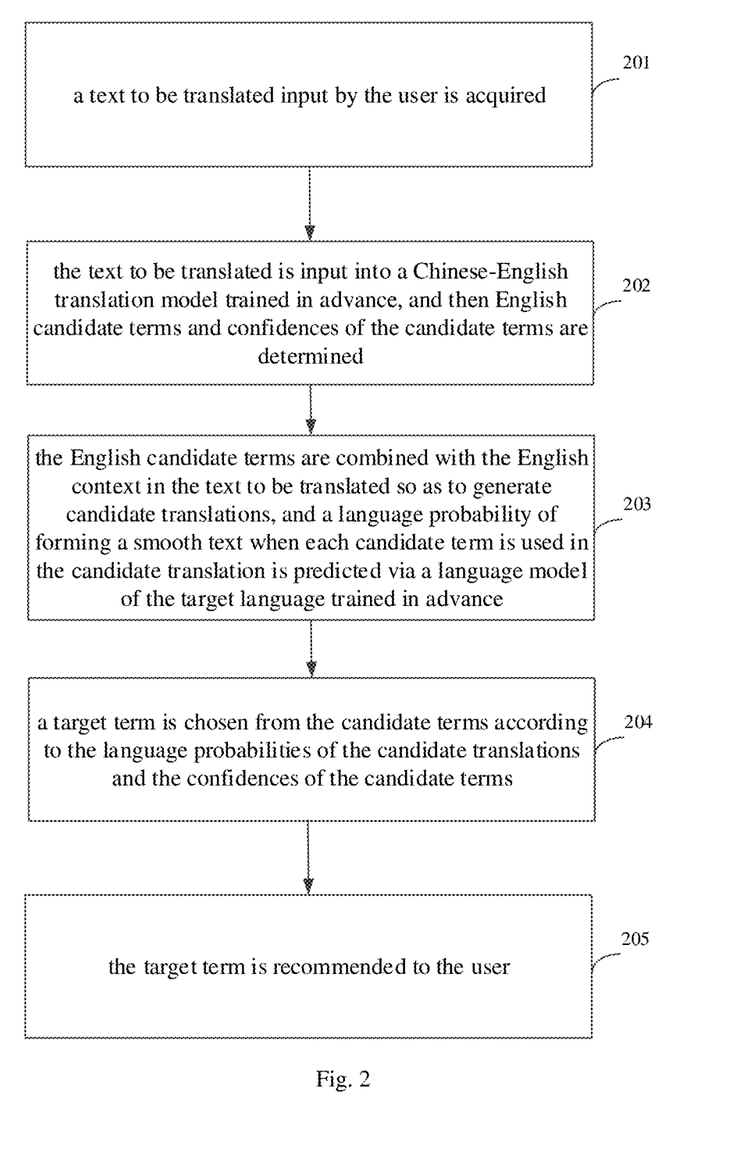
FIG. 2 is a flow chart illustrating a method for translating based on AI according to another embodiment of the present disclosure.

To illustrate the above embodiment more clearly, another method for translating based on AI in a Chinese-English translation scenario is provided in an embodiment of the present embodiment, that is to say, in this embodiment, the source language is Chinese and the target language is English. FIG. 2 is a flow chart illustrating a method for translating based on AI according to another embodiment of the present disclosure. As illustrated in FIG. 2, the method for translating based on AI includes followings.

At block 201, a text to be translated input by the user is acquired.

When the Chinese user is writing in English, if there is a Chinese term that he/she feels not sure the corresponding English term, this Chinese term may be inserted in multiple English terms. Therefore the text to be translated includes not only multiple English terms but also Chinese terms.

For example, a Chinese term "提出" may have multiple corresponding expressions in English. When the user is not sure about which expression is appropriate, a sentence such as "This paper 提出 an optimized algorithm" may be input, so as to seek for the best translation of the Chinese term "提出".

At block 202, the text to be translated is input into a Chinese-English translation model trained in advance, and then English candidate terms and confidences of the candidate terms are determined.

Figure 3:
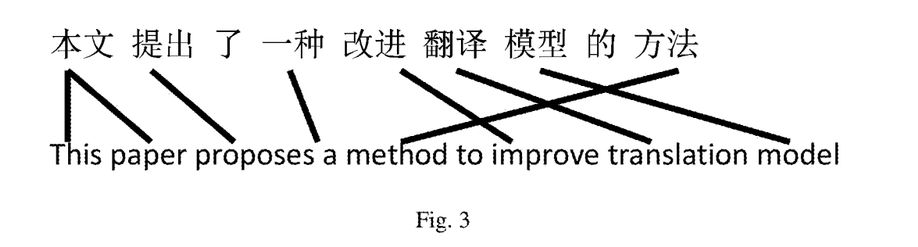
FIG. 3 is a schematic diagram illustrating a piece of Chinese-English corpora.

In detail, the translation model is trained in advance. During a training process, by segmentation of a bilingual corpus and alignment, English terms corresponding to each Chinese term can be extracted. FIG. 3 is a schematic diagram illustrating a piece of Chinese-English corpora. As illustrated in FIG. 3, an English term and a corresponding Chinese term is connected by a line. Since there are a lot of these kinds of corpora in the bilingual corpus, for each Chinese term, there may be multiple corresponding English terms. The multiple English terms are used as the candidate terms and the probability for each English term to be used in a translation of the Chinese term, i.e. the confidence of each candidate term, can be calculated thereby.

For example, an equation $$P(e \mid f) = \frac{O(e, f)}{\sum_{e'} O(e', f)}$$

may be used, in which O(e, f) represents the number of times that the English term e is used to translate the Chinese term f, e' represents a set of all the English terms that may be used to translate the Chinese term f, $$\sum_{e'} O(e', f)$$

represents the overall number of times that the terms in the set e' are used to translate the Chinese term f. In the above equation, P(e|f) represents the confidence that the English term e is used for the translation of the Chinese term f.

At block 203, the English candidate terms are combined with the English context in the text to be translated so as to generate candidate translations, and a language probability of forming a smooth text when each candidate term is used in the candidate translation is predicted via a language model of the target language trained in advance.

In an embodiment, the language model is configured to predict a smooth level of a sentence, i.e. how much does the sentence match to common expressions.

For example, for a text to be translated "This paper 提出 an optimized algorithm", at the above block, corresponding candidate terms of "提出" may be obtained as "describes" and "introduces", thus the generated translation may be "This paper introduces an optimized algorithm" and "This paper describes an optimized algorithm". The generated translation is predicted by a language model $$LM(E) = \sum_{i=1}^{t} p(e_i \mid e_{i-1}, \ldots, e_1),$$

in which, $e_i$ represents the $i^{th}$ term in the translation, $e_1, e_2, \ldots, e_{i-1}$ represents the English context of $e_i$, for example, the terms before e, in the candidate translation.

P(introduces |This paper) and P(describes| This paper) may be calculated via the language model. As a possible result, P(introduces |This paper) may be greater than P(describes| This paper), which means for segments "this paper", the probability of followed by "introduces" is greater than the probability of followed by "describes".

At block 204, a target term is chosen from the candidate terms according to the language probabilities of the candidate translations and the confidences of the candidate terms.

In detail, an equation $S(E)=\alpha \times LM(E)+\beta \times P(e \mid f)$ may be used to calculate an overall probability of each candidate term, in which, the weighting parameters $\alpha$ and $\beta$ may be adjusted in a way of minimum error rate with a restriction of $\alpha+\beta=1$.

At block 205, the target term is recommended to the user.

Figure 4:
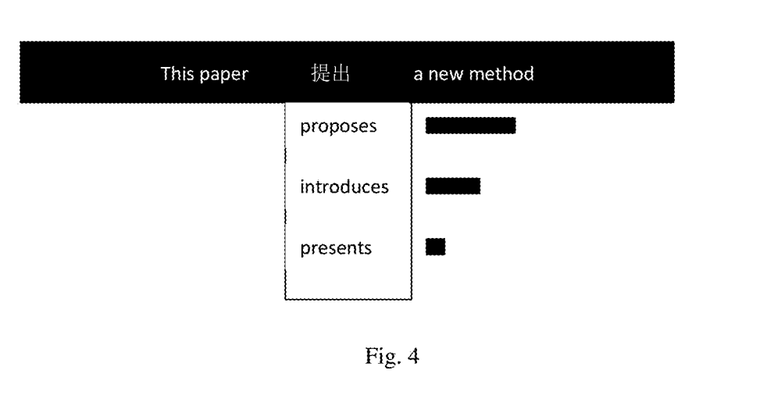
FIG. 4 is a schematic diagram illustrating displaying of a target term.

In an embodiment, a GUI (graphical user interface) as illustrated in FIG. 4 may be displayed in a terminal at the user end. At least two chosen terms may be displayed under the corresponding source language term, in an order of the overall probabilities from great to small. In addition, the overall probability of each target term may be tagged aside by a progress bar for the user's reference.

In the present embodiment, a scenario that the text to be translated only has one source language term is illustrated. As another possible application scenario, the text to be translated input by the user may include more than one source language terms, therefore it is needed to input each of the source language terms into the translation model and determine the corresponding candidate terms and confidences thereof. Then an overall confidence P(e |f) of a combination of all candidate terms is calculated by $$P(e \mid f) = \sum_i P(e_i \mid f_i),$$

in which, i' represents an order of the source language term, $e_i$ represents the target language term corresponding to the $i^{th}$ source language term $f_i$. And then, the candidate terms are combined with the context to generate the candidate translations, and the language probability of each candidate translation is predicted. Finally, the overall probability is calculated according to the overall confidence and the language probability, and the target terms are sorted according to corresponding overall probabilities, candidate terms in the front of the sorted sequence are recommended.

For example, when "This paper 提出 a 新方法" is input by the user, there are two source language terms "提出" and "新方法", according to the above method, and the overall probabilities are as follows.

Figure 5:
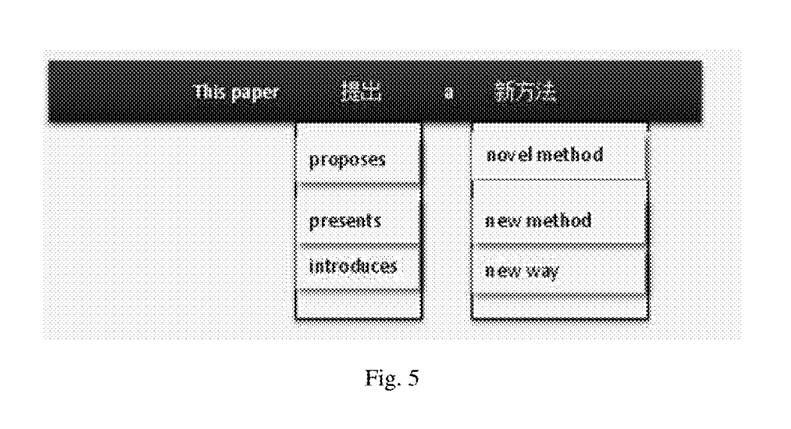
FIG. 5 is another schematic diagram illustrating displaying of a target term.

S(This paper proposes a novel method)=α*LM (This paper proposes a novel method)+β*(P(proposes 提出)+P (novel method 新方法)); in which, P(proposes|提出) and P(novel method|新方法) represent confidences of candidate terms "proposes" and "novel method" corresponding to the two source language terms, LM (This paper proposes a novel method) represents a language probability of a candidate translation including a combination of the candidate terms "proposes" and "novel method", S(This paper proposes a novel method) represents the overall probability of the combination of the candidate terms. According to the overall probability sorting result, target terms of multiple candidate term combinations are chosen and recommended to the user in a way illustrated in FIG. 5.

Figure 6:
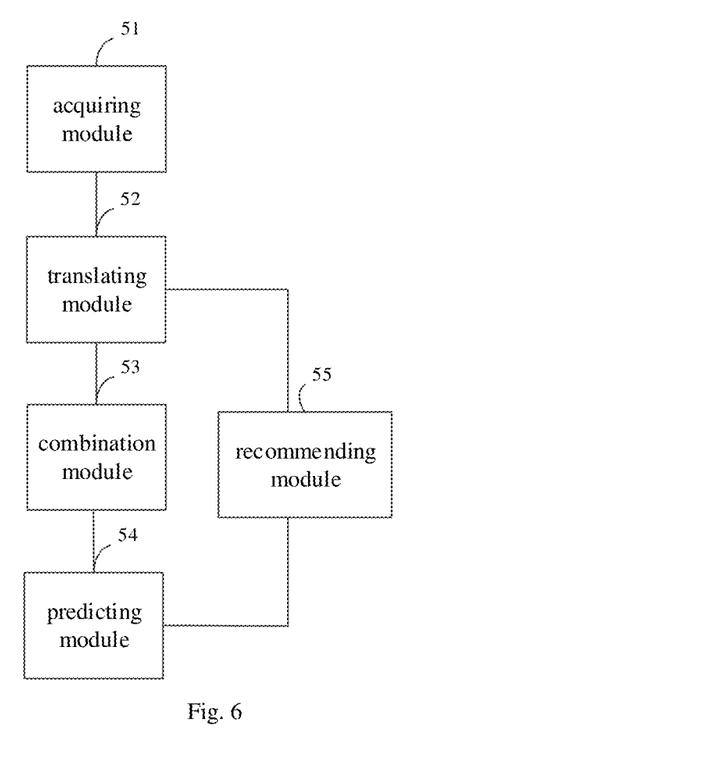
FIG. 6 is a block diagram illustrating an apparatus for translating based on AI according to an embodiment of the present disclosure.

To achieve the above embodiments, the present disclosure also provides an apparatus for translating based on AI. FIG. 6 is a block diagram illustrating an apparatus for translating based on AI according to an embodiment of the present disclosure.

As illustrated in FIG. 6, the apparatus for translating based on AI includes an acquiring module 51, a translating module 52, a combination module 53, a predicting module 54 and a recommending module 55.

The acquiring module 51 is configured to acquire a text to be translated from a source language to a target language. The text to be translated includes a target language term and a source language term.

The translating module 52 is configured to input the text to be translated into a translation model of the source language and the target language trained in advance, and determine candidate terms for translating the source language term and confidences of the candidate terms.

The combination module 53 is configured to replace the source language term by each of the candidate terms, and combine the each of the candidate terms with the target language term, so as to obtain candidate translations.

The predicting module 54 is configured to input each of the candidate translations into a language model of the target language trained in advance, and predict a language probability of the each of the candidate translations to form a smooth text by using the corresponding candidate term.

The recommending module 55 is configured to choose a target term from the candidate terms according to the language probabilities of the candidate translations and the confidences of the candidate terms and recommend the target term.

It should be understood that the descriptions of the methods in the above embodiments may also be applied to the apparatus according to embodiments of the present disclosure, thus will not be elaborated here.

Figure 7:
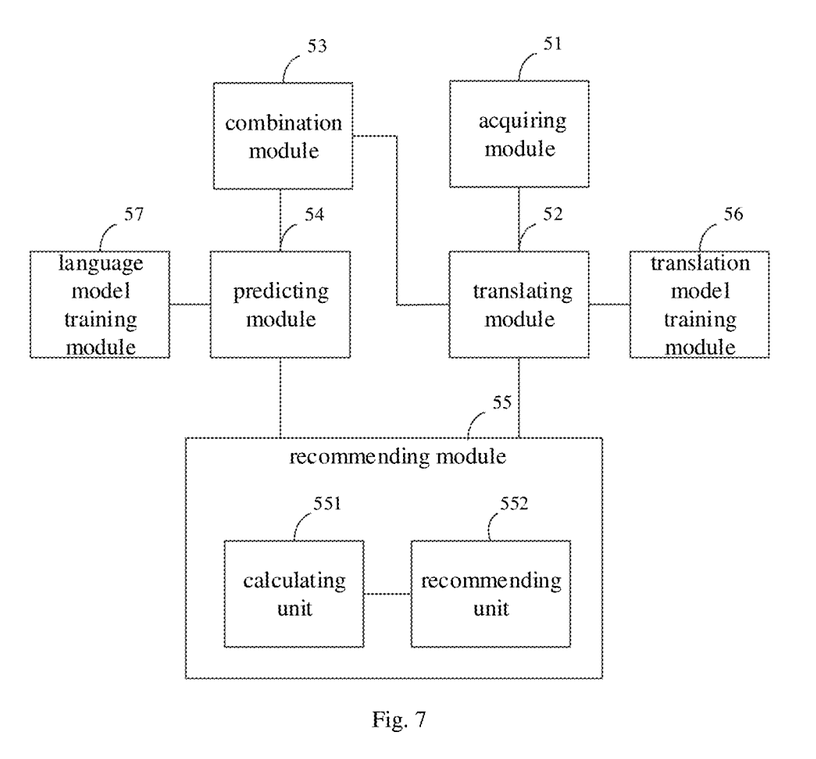
FIG. 7 is a block diagram illustrating an apparatus for translating based on AI according to another embodiment of the present disclosure.

Based on the above embodiments, the present disclosure also provides another apparatus for translation based on AI. FIG. 7 is a block diagram illustrating an apparatus for translation based on AI according to another embodiment of the present disclosure. On the basis of the above embodiment, the recommending module 55 includes a calculating unit 551 and a recommending unit 552.

The calculating unit 551 is configured to calculate, for the each of the candidate terms, a weighted summation of the language probability of the corresponding candidate translation by using the each of the candidate terms and the confidence of the each of the candidate terms so as to obtain an overall probability of the each of the candidate terms.

The recommending unit 552 is configured to sort the candidate terms according to their overall probabilities and choose the target term from the candidate terms according to a sorting result.

In an embodiment of the present disclosure, the target term includes at least two target terms.

Based on the above, the recommending unit 552 is configured to display the at least two target terms under the source language term, in an order of the overall probabilities from great to small. In addition, the overall probability of each of the at least two target terms is tagged aside by a progress bar.

In an embodiment of the present disclosure, the apparatus for translating based on AI further includes a translation model training module 56 and a language model training module 57.

The translation model training module 56 is configured to train the translation model by a bilingual corpus of the source language and the target language, so as to obtain source language terms and target language terms which have semantic correspondences, and confidences of translating accurately the source language terms by the corresponding target language terms. In detail, the confidence of the candidate term may be denoted according to a ratio that the number of times that the source language term is translated into the target language term accounts for the number of times that the source language term is translated.

The language model training module 57 is configured to train the language model of the target language according to a target language corpus, wherein the target language corpus is established according to at least one of academic conferences, academic journals, and papers of the target language.

In detail, the language model may be an n-gram language model or a neural network language model.

With the present embodiment, the text to be translated from the source language to the target language input by a user is acquired, in which, the text to be translated includes the target language term and the source language term. The text to be translated is input into the translation model of the source language and the target language trained in advance, and the candidate terms for translating the source language term and the confidences of the candidate terms are determined. The candidate terms are used to replace the source language term in the text to be translated, and each candidate term is combined with the target language term, so as to obtain each candidate translation. The candidate translation is input into the language model of the target language trained in advance, and the probability of forming the smooth text when the candidate term is used in the candidate translation is predicted. Then the target term is chosen to recommend from the candidate terms according to the language probabilities of the candidate translations and the confidences of the candidate terms. Since when the user is not sure about the translation, the target term surely to be accurate and the source language term of which translations are not sure may be input, the problem of inflexible translation in the prior art may be solved.

To achieve the above embodiments, the present disclosure also provides another apparatus for translating based on AI, which includes: a processor; and a memory for storing instructions executable by the processor, in which, the processor is configured to: acquire a text to be translated from a source language to a target language, in which, the text to be translated includes a target language term and a source language term; input the text to be translated into a translation model of the source language and the target language trained in advance, and determine candidate terms for translating the source language term and confidences of the candidate terms; replace the source language term by each of the candidate terms, and combine the each of the candidate terms with the target language term, so as to obtain candidate translations; input each of the candidate translations into a language model of the target language trained in advance, and predict a language probability of the each of the candidate translations to form a smooth text by using the corresponding candidate term; choose a target term from the candidate terms according to the language probabilities of the candidate translations and the confidences of the candidate terms and recommend the target term.

To achieve the above embodiments, the present disclosure also provides a non-transitory computer readable storage medium. When instructions stored in the storage medium is executed by a processor of a server, the server is caused to perform a method for translation based on AI, and the method includes: acquiring a text to be translated from a source language to a target language, in which the text to be translated includes a target language term and a source language term; inputting the text to be translated into a translation model of the source language and the target language trained in advance, and determining candidate terms for translating the source language term and confidences of the candidate terms; replacing the source language term by each of the candidate terms, and combining the each of the candidate terms with the target language term, so as to obtain candidate translations; inputting each of the candidate translations into a language model of the target language trained in advance, and predicting a language probability of the each of the candidate translations to form a smooth text by using the corresponding candidate term; choosing a target term from the candidate terms according to the language probabilities of the candidate translations and the confidences of the candidate terms; and recommending the target term.

To achieve the above embodiments, the present disclosure also provides a computer program product. When instructions stored in the computer program product is executed by a processor, a method for translation based on AI is performed, and the method includes: acquiring a text to be translated from a source language to a target language, in which the text to be translated includes a target language term and a source language term; inputting the text to be translated into a translation model of the source language and the target language trained in advance, and determining candidate terms for translating the source language term and confidences of the candidate terms; replacing the source language term by each of the candidate terms, and combining the each of the candidate terms with the target language term, so as to obtain candidate translations; inputting each of the candidate translations into a language model of the target language trained in advance, and predicting a language probability of the each of the candidate translations to form a smooth text by using the corresponding candidate term; choosing a target term from the candidate terms according to the language probabilities of the candidate translations and the confidences of the candidate terms; and recommending the target term.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, for example, two, there etc., unless specifically and particularly prescribed otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been illustrated and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for translating based on artificial intelligence, comprising:
    acquiring, by at least one computing device, a text to be translated from a source language to a target language, wherein the text to be translated comprises a target language term and a source language term;
    inputting, by the at least one computing device, the text to be translated into a translation model of the source language and the target language trained in advance, and determining, by the at least one computing device, candidate terms for translating the source language term and confidences of the candidate terms;
    replacing, by the at least one computing device, the source language term by each of the candidate terms, and combining, by the at least one computing device, the each of the candidate terms with the target language term, so as to obtain candidate translations;
    inputting, by the at least one computing device, each of the candidate translations into a language model of the target language trained in advance, and predicting, by the at least one computing device, a language probability of the each of the candidate translations to form a smooth text by using the corresponding candidate term;
    choosing, by the at least one computing device, a target term from the candidate terms according to the language probabilities of the candidate translations and the confidences of the candidate terms; and
    recommending, by the at least one computing device, the target term.

2. The method according to claim 1, wherein, choosing, by the at least one computing device, a target term from the candidate terms according to the language probabilities of the candidate translations and the confidences of the candidate terms, comprises:
    calculating, by the at least one computing device, for the each of the candidate terms, a weighted summation of the language probability of the corresponding candidate translation by using the each of the candidate terms and the confidence of the each of the candidate term so as to obtain an overall probability of the each of the candidate terms;
    sorting, by the at least one computing device, the candidate terms according to their overall probabilities;
    choosing, by the at least one computing device, the target term from the candidate terms according to a sorting result.

3. The method according to claim 2, wherein, the target term comprises at least two target terms, and recommending, by the at least one computing device, the target term comprises:
    displaying, by the at least one computing device, the at least two target terms under the source language term, in an order of the overall probabilities from great to small.

4. The method according to claim 3, wherein, the overall probability of each of the at least two target terms is tagged aside by a progress bar.

5. The method according to claim 1, further comprising:
    training, by the at least one computing device, the translation model by a bilingual corpus of the source language and the target language, so as to obtain source language terms and target language terms which have semantic correspondences, and confidences of translating accurately the source language terms by the corresponding target language terms.

6. The method according to claim 5, wherein, the confidence is a ratio that the number of times that the source language term is translated into the corresponding target language term accounts for the number of times that the source language term is translated.

7. The method according to claim 1, further comprising:
training, by the at least one computing device, the language model of the target language according to a target language corpus, wherein the target language corpus is established according to at least one of academic conferences, academic journals, and papers of the target language.

8. The method according to claim 7, wherein, the language model comprises an n-gram language model or a neural network language model.

9. An apparatus for translating based on artificial intelligence, comprising:
a processor; and
a memory, configured to store instructions executable by the processor, wherein the processor is configured to:
    acquire a text to be translated from a source language to a target language, wherein the text to be translated comprises a target language term and a source language term;
    input the text to be translated into a translation model of the source language and the target language trained in advance, and determine candidate terms for translating the source language term and confidences of the candidate terms;
    replace the source language term by each of the candidate terms, and combine the each of the candidate terms with the target language term, so as to obtain candidate translations;
    input each of the candidate translations into a language model of the target language trained in advance, and predict a language probability of the each of the candidate translations to form a smooth text by using the corresponding candidate term;
    choose a target term from the candidate terms according to the language probabilities of the candidate translations and the confidences of the candidate terms; and
    recommend the target term.

10. The apparatus according to claim 9, wherein the processor is configured to choose a target term from the candidate terms according to the language probabilities of the candidate translations and the confidences of the candidate terms by acts of:
    calculating for the each of the candidate terms, a weighted summation of the language probability of the corresponding candidate translation by using the each of the candidate terms and the confidence of the each of the candidate term so as to obtain an overall probability of the each of the candidate terms;
    sorting the candidate terms according to their overall probabilities;
    choosing the target term from the candidate terms according to a sorting result.

11. The apparatus according to claim 10, wherein, the target term comprises at least two target terms, and the processor is configured to recommend the target term by acts of:
    displaying the at least two target terms under the source language term, in an order of the overall probabilities from great to small.

12. The apparatus according to claim 11, wherein, the overall probability of each of the at least two target terms is tagged aside by a progress bar.

13. The apparatus according to claim 9, wherein the processor is further configured to:
    train the translation model by a bilingual corpus of the source language and the target language, so as to obtain source language terms and target language terms which have semantic correspondences, and confidences of translating accurately the source language terms by the corresponding target language terms.

14. The apparatus according to claim 13, wherein, the confidence is a ratio that the number of times that the source language term is translated into the corresponding target language term accounts for the number of times that the source language term is translated.

15. The apparatus according to claim 9, wherein the processor is further configured to:
    train the language model of the target language according to a target language corpus, wherein the target language corpus is established according to at least one of academic conferences, academic journals, and papers of the target language.

16. The apparatus according to claim 15, wherein the language model comprises an n-gram language model or a neural network language model.

17. A non-transitory computer readable storage medium, with instructions stored, wherein the instructions are executed by a processor to achieve a method for translating based on artificial intelligence, and the method comprises:
    acquiring a text to be translated from a source language to a target language, wherein the text to be translated comprises a target language term and a source language term;
    inputting the text to be translated into a translation model of the source language and the target language trained in advance, and determining candidate terms for translating the source language term and confidences of the candidate terms;
    replacing the source language term by each of the candidate terms, and combining the each of the candidate terms with the target language term, so as to obtain candidate translations;
    inputting each of the candidate translations into a language model of the target language trained in advance, and predicting a language probability of the each of the candidate translations to form a smooth text by using the corresponding candidate term;
    choosing a target term from the candidate terms according to the language probabilities of the candidate translations and the confidences of the candidate terms; and
    recommending the target term.

18. The non-transitory computer readable storage medium according to claim 17, wherein, choosing a target term from the candidate terms according to the language probabilities of the candidate translations and the confidences of the candidate terms, comprises:
    calculating for the each of the candidate terms, a weighted summation of the language probability of the corresponding candidate translation by using the each of the candidate terms and the confidence of the each of the candidate term so as to obtain an overall probability of the each of the candidate terms;
    sorting the candidate terms according to their overall probabilities;
    choosing the target term from the candidate terms according to a sorting result.

19. The non-transitory computer readable storage medium according to claim 18, wherein, the target term comprises at least two target terms, and recommending the target term comprises:
    displaying the at least two target terms under the source language term, in an order of the overall probabilities from great to small.

20. The non-transitory computer readable storage medium according to claim 17, wherein the method further comprises:
 training the translation model by a bilingual corpus of the source language and the target language, so as to obtain source language terms and target language terms which have semantic correspondences, and confidences of translating accurately the source language terms by the corresponding target language terms.

* * * * *